United States Patent [19]
Inami et al.

[11] Patent Number: 5,612,810
[45] Date of Patent: Mar. 18, 1997

[54] OPTICAL RECEIVING APPARATUS

[75] Inventors: Daijiro Inami, Tokyo; Yuichi Sato, Miyagi, both of Japan

[73] Assignee: NEC Corporation, Tokyo, Japan

[21] Appl. No.: 527,036

[22] Filed: Sep. 12, 1995

[30] Foreign Application Priority Data

Sep. 12, 1994 [JP] Japan ................................ 6-217404

[51] Int. Cl.$^6$ ................................................ H04B 10/06
[52] U.S. Cl. ........................ 359/189; 250/214 A; 330/59
[58] Field of Search ................................ 359/189, 194, 359/154; 250/214 A; 330/59, 308

[56] References Cited

U.S. PATENT DOCUMENTS 5,025,456  6/1991  Ota et al. ................................ 375/76

FOREIGN PATENT DOCUMENTS

0285534  12/1987  Japan ................................ 359/189
4065933   3/1992  Japan ................................ 359/189

*Primary Examiner*—Wellington Chin
*Assistant Examiner*—Kinfe-Michael Negash
*Attorney, Agent, or Firm*—Scully, Scott, Murphy & Presser

[57] ABSTRACT

An optical receiving apparatus of the present invention comprises an opto-electric conversion element for converting an optical signal into an electric signal, a differential type preamplifier for sending a non-inverting phase signal and a inverting phase signal of the electric signal and a first and second peak hold circuits for holding peak values of the respective non-inverting and inverting phase signals. Further, the optical receiving apparatus of the present invention comprises a first adder for adding the inverting phase signal to the non-inverting phase peak signal from the first peak hold circuit and a second adder for adding the non-inverting phase signal to the inverting phase peak signal from the second peak hold circuit. Further, the optical receiving apparatus comprises a main amplifier including a differential amplifier having inputs supplied with outputs of the first and second adders and a comparator for outputting a binary signal correspondingly to a high and low levels of two output signals of the differential amplifier. The peak values of the non-inverting and inverting phase signals of the receiving signal are held and added by a feedforward connection.

9 Claims, 9 Drawing Sheets

FIG. 9 a logical value "0". An example of such conventional optical receiving apparatus is disclosed in U.S. Pat. No. 5,025,456.
OPTICAL RECEIVING APPARATUS

BACKGROUND OF THE INVENTION

The present invention relates to an optical receiving apparatus and, particularly, to an optical receiving apparatus to be used in a transmission of digital data in the form of burst in such as a passive double star optical communication system or an ESSANET communication system.

In a conventional optical receiving apparatus, an optical signal input to the receiving apparatus is converted into an electric current signal by a receiving element such as avalanche photo-diode and the current signal is amplified by a preamplifier. The preamplifier is constructed with feedback resistors and a peak hold circuit. A comparator compares the amplified current signal level with a predetermined threshold level and when it is higher than the threshold level, the signal is discriminated as a logical value "1" and, when it is lower than the threshold level, the signal is discriminated as a logical value "0". An example of such conventional optical receiving apparatus is disclosed in U.S. Pat. No. 5,025,456.

However, there are two problems inherent to the conventional optical receiving apparatus. The first problem is that duty factor of an output waveform is considerably varied due to analog error such as offset error of the preamplifier. The existence of offset error in a differential amplifier which is used in the preamplifier may be a source of level variation of the output waveform of the receiving signal. In order to remove the offset in the differential amplifier, it is possible to regulate the offset by initially regulating the threshold level, that is, reference voltage of the comparator. However, since it is difficult to regulate the offset by taking environmental condition of the apparatus such as ambient temperature and condition of a power source thereof into consideration, the offset may be changed externally necessarily and duty factor of the output waveform of the receiving signal may be varied. With such variation of duty factor of the output waveform of the receiving signal, a margin for data discrimination becomes substantially small particularly when the receiving signal level is low. As a result, the minimum input level of the optical receiving apparatus itself is limited.

In the optical receiving apparatus which processes digital data in the form of burst, it is general to extract a timing signal or clock signal on the basis of information of both a rising edge and a falling edge of the data since a high speed synchronization is necessary. Therefore, jitter of the extracted clock is increased and the synchronizing characteristics is degraded, due to the duty factor variation.

The second problem is that, since the differential amplifier includes a feedback loop, the design of the apparatus requires an enough margin for oscillation and, therefore, the signal frequency band and amplification of the differential amplifier are severely restricted.

SUMMARY OF THE INVENTION

A first object of the present invention is to provide an optical receiving apparatus free from degradation of duty factor of an output waveform of a receiving signal and free from reduction of margin in data discrimination even when a receiving signal level is low.

A second object of the present invention is to provide an optical receiving apparatus free from increase of jitter of extracted clock, degradation of synchronizing characteristics of the apparatus and restriction of a signal band and amplification factor of the apparatus.

An optical receiving apparatus according to the present invention comprises an opto-electric conversion element for converting an optical signal into an electric signal, a differential type preamplifier for producing a non-inverting phase signal and a inverting or reverse phase signal of the converted electric signal and first and second peak hold circuits for holding peak values of the respective non-inverting phase and inverting phase signals. Further, the optical receiving apparatus according to the present invention comprises a first adder for adding the inverting phase signal to the peak hold value of the non-inverting phase signal from the first peak hold circuit and a second adder for adding the non-inverting phase signal to the peak hold value of the inverting phase signal from the second peak hold circuit. The optical receiving apparatus further comprises a main amplifier including a differential amplifier supplied with output signals of the first and second adders and a comparator for outputting a binary signal according to high and low levels of two output signals of the differential amplifier.

In the optical receiving apparatus of the present invention, peak values of the non-inverting phase and inverting phase of the receiving signal are held and added by feedforward connection. Therefore, there is no degradation of duty factor of the output waveform due to offset of the receiving signal and the preamplifier. Further, it is possible to perform a data discrimination even when the level of the receiving signal is low.

In addition, since there is no need of using a feedback loop in the differential amplifier, the signal band and amplification of the differential amplifier are not limited.

BRIEF DESCRIPTION OF THE DRAWINGS

The above-mentioned and other objects, features and advantages of the present invention will become more apparent from the following detailed description when taken in conjunction with the accompanying drawings wherein.

DETAILED DESCRIPTION OF THE PREFERRED EMBODIMENTS

In order to facilitate an understanding of the optical receiving apparatus of the present invention, a conventional optical receiving apparatus will be described briefly first.

Figure 1:
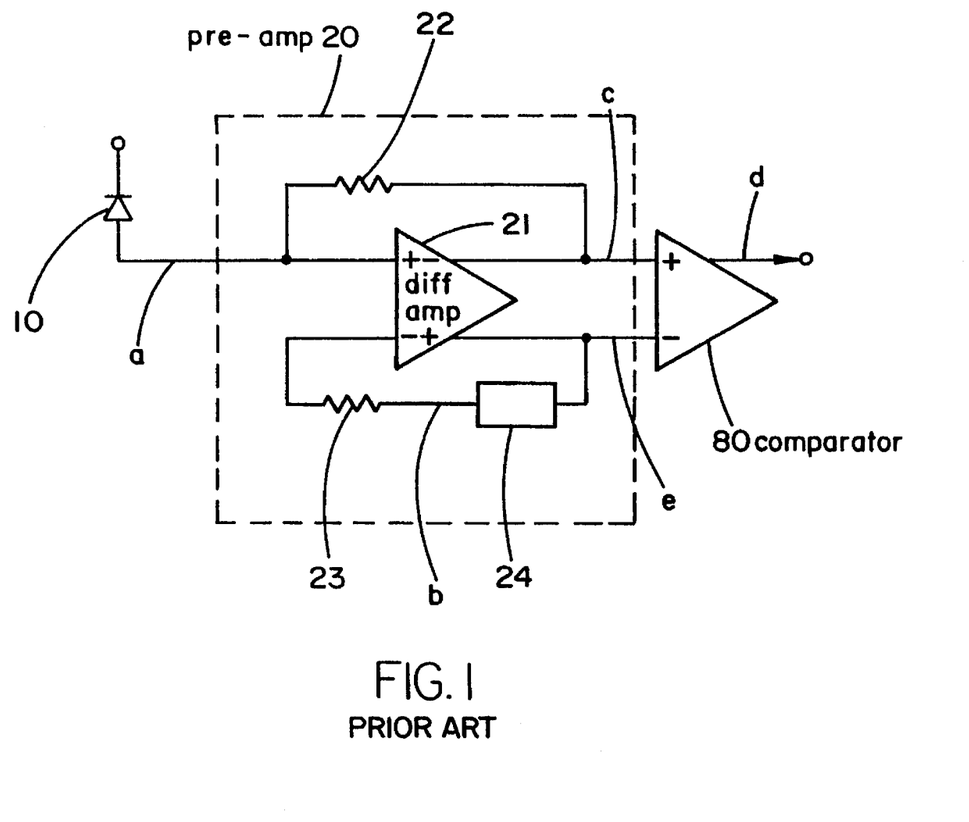
FIG. 1 is a block diagram showing a construction of a conventional optical receiving apparatus.

FIG. 1 is a block diagram showing a construction of the conventional optical receiving apparatus.

The conventional optical receiving apparatus is constructed with a light receiving element 10, a preamplifier 20 composed of a differential amplifier 21, feedback resistors 22 and 23 and a peak hold circuit 24 and a comparator 80, as shown in FIG. 1. An optical signal received by the light receiving element 10 is converted into an electric signal. The electric signal is amplified by the preamplilier 20 and then discriminated by the comparator 80 with reference to a predetermined threshold value. When the electric signal level is higher than the threshold value, the comparator 80 outputs a logical value "1" and, when lower than the threshold value, it outputs a logical value "0".

Figure 2:
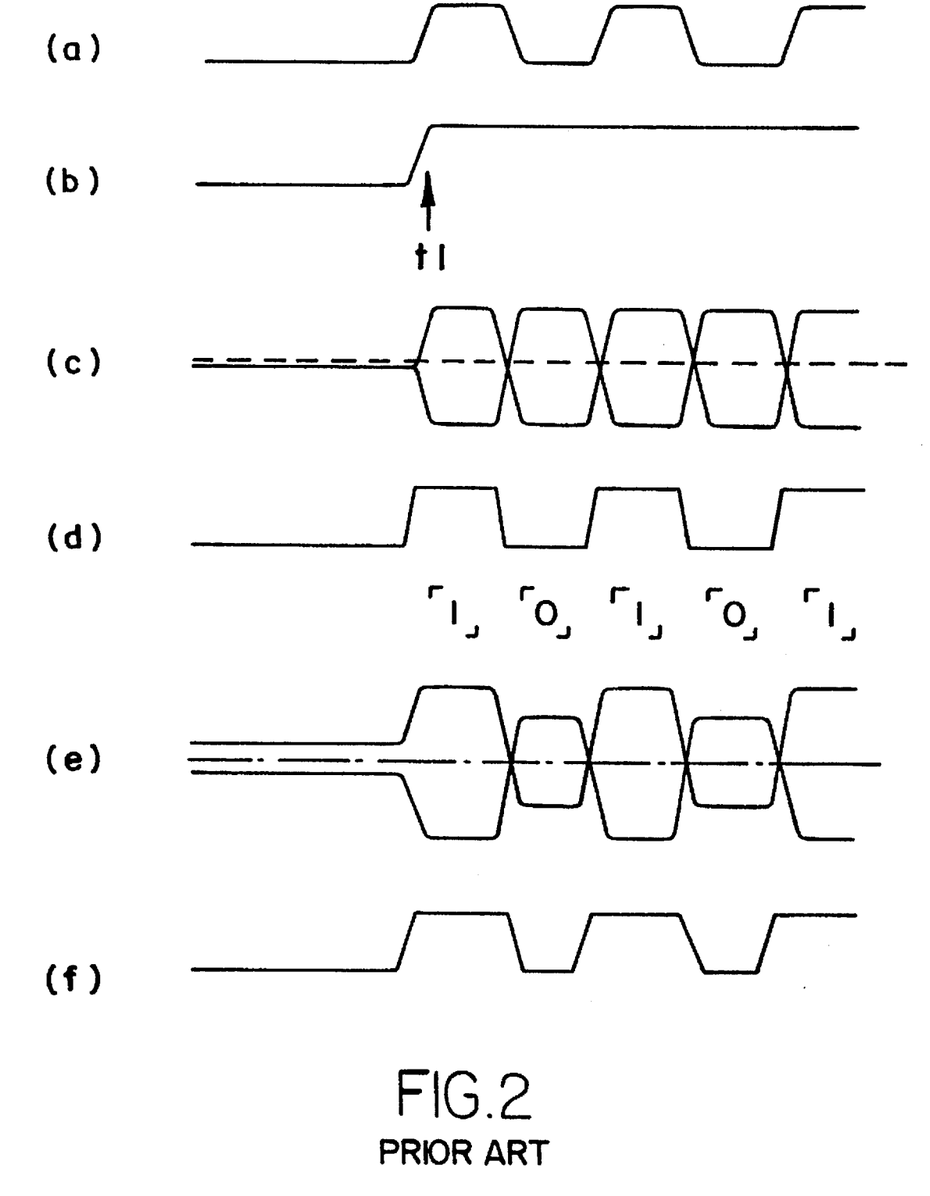
FIG. 2 shows signal waveforms at various portions of the conventional optical receiving apparatus shown in FIG. 1.

FIG. 2 shows signal waveforms at various portions of the optical receiving apparatus shown in FIG. 1 when it receives a digital data in burst. When the conventional optical receiving apparatus shown in FIG. 1 is ready to receive a signal, a hold capacitance of the peak hold circuit 24 is in discharged state. Therefore, when the burst signal shown in FIG. 2(a) is received, the peak hold circuit 24 outputs an output signal having waveform shown in FIG. 2(b). In this case, the peak hold circuit 24 detects a peak voltage of a top bit of the burst signal and holds it continuously. As will be described later, current-voltage conversion gain (amplitude of output voltage/amplitude of input current=Io/Ii) of the preamplifier circuit 20 has either of two values according to the state of the peak hold circuit 24. A transition time point of the state of the peak hold circuit 24 is shown by t1 in FIG. 2(b).

That is, in a time period t immediately before t1, the peak hold circuit 24 is in a charging state and its output voltage follows the input voltage. Thus, a non-inverting phase output voltage of the differential amplifier 21 is feedback through the resistor 23 to a reverse phase input of the differential amplifier 21. In this state, a relation of Vo/Ii= Rf/2 is satisfied.

On the other hand, in a time period t after t1, the peak hold circuit 24 is fully charged and, therefore, the output voltage thereof is held at the constant peak value regardless of the input voltage. The inverting phase input of the differential amplifier 21 is equivalent to a ground potential and thus Vo/Ii=Rf.

Therefore, the amplification factor of the preamplifier 20 after t1 is twice that before t1 and the output of the preamplifier 20 becomes as shown in FIG. 2(c). The output of the preamplifier 20 is discriminated as the logical value "1" and "0", as shown in FIG. 2 (d) by comparing it with a reference value shown by a dotted line in FIG. 2 (c) in the comparator 80.

However, duty factor of the output waveform varies substantially due to analog error such as offset. When there is an offset in the differential amplifier 21, the waveform level of the output of the differential amplifier 21 varies as shown in FIG. 2(e). Initially, it may be possible to remove such offset by regulating the reference voltage of the comparator 80. However, due to a variation of external condition such as ambient temperature of the apparatus and condition of the power source thereof, duty factor of the output waveform of the comparator 80 varies as shown in FIG. 2(f).

With the variation of duty factor of the output waveform of the comparator, the margin for the data discrimination is reduced considerably when the receiving signal level is small. As a result, the minimum input level of the optical receiving apparatus itself is limited.

In an optical receiving apparatus which processes digital data in burst, it is general to extract a timing signal on the basis of an information of both a rising edge and a falling edge of the data since a high speed synchronization is necessary. Therefore, jitter of the extracted clock is increased and the synchronizing characteristics of the optical receiving apparatus is degraded, due to the duty factor variation.

Further, due to the feedback loop of the differential amplifier 21, the optical receiving apparatus must be designed to have an enough margin for oscillation of the differential amplifier. Therefore, the signal frequency band and amplification factor of the differential amplifier are severely restricted.

Now, the present invention will be described in detail with reference to the drawings.

The optical receiving apparatus of the present invention comprises peak value detection means for detecting a peak value of an input signal and a peak value region including the peak value; offset removing means for removing an offset from a reference value of the input signal and outputting the input signal without offset; amplitude amplification means for converting a bottom region of the input signal into the peak value and an inverting value obtained by inverting the peak value about the reference value, amplifying then and outputting an amplitude amplified signal; and duty means for detecting a duty of the amplitude amplified signal in the reference value.

Figure 3:
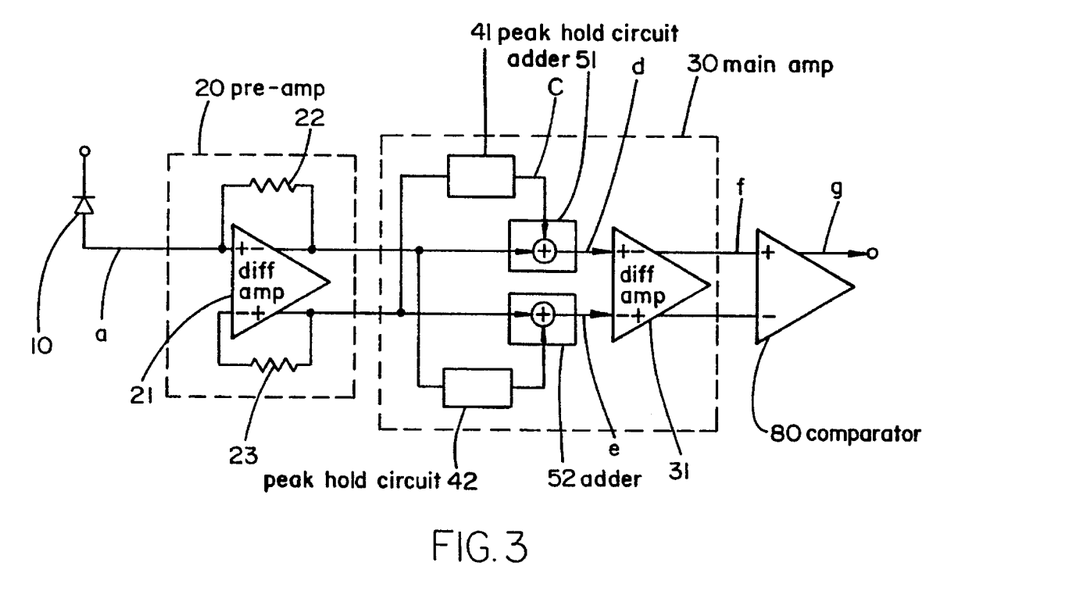
FIG. 3 is a block diagram of the first embodiment of the optical receiving apparatus of the present invention.

FIG. 3 is a block diagram of an optical receiving apparatus according to a first embodiment of the present invention which comprises a light receiving element 10, a preamplifier 20, a main amplifier 30 and a comparator 80. Similarly to the conventional optical receiving apparatus mentioned above, the respective blocks are d.c. connected in order to transmit an arbitrary data pattern. An optical signal input to the light receiving element 10 is converted thereby into an electric signal which is amplified by the preamplifier 20 up to a predetermined magnitude. The preamplifier 20 is constituted with a differential amplifier 21 and feedback resistors 22 and 23. The signal amplified by the preamplifier 20 is further amplified to a predetermined level by the main amplifier 30. Thereafter, an output of the main amplifier 30 is compared with a predetermined threshold value by the comparator 80 and converted into a logical "1" or "0". The main amplifier 30 is constituted with peak hold circuits 41 and 42, adders 51 and 52 and a differential amplifier 31.

Figure 4:
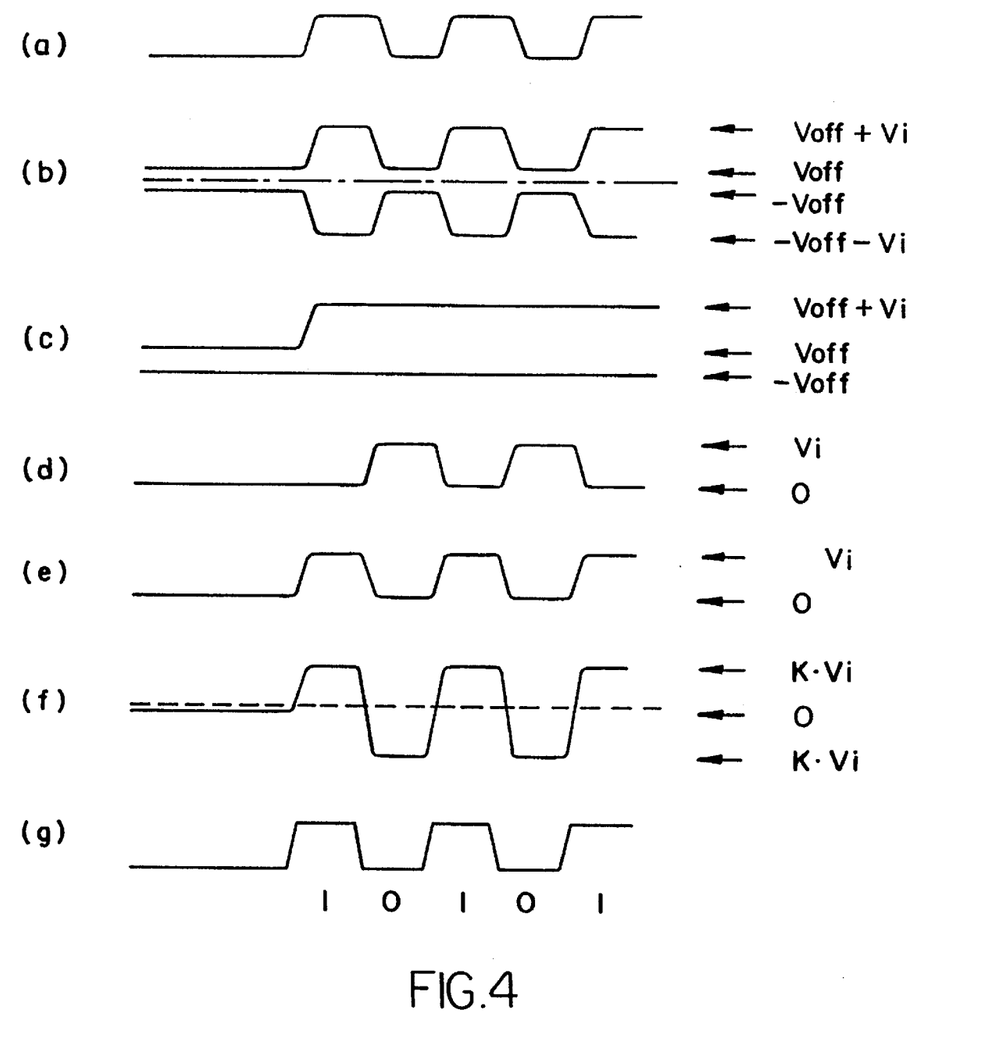
FIGS. 4 shows signal waveforms at various portions of the first embodiment of the optical receiving apparatus according to the present invention.

FIG. 4 shows signal waveforms in various portions of the optical receiving apparatus shown in FIG. 3, when the optical receiving apparatus receives digital data in burst. When the optical receiving apparatus shown in FIG. 3 is ready to receive an optical signal, holding capacitors of the peak hold circuits 41 and 42 have been discharged. In this state, when a burst signal such as shown in FIG. 4(a) is input, a non-inverting phase output waveform and a inverting phase output waveform such as shown in FIG. 4(b) are obtained from the preamplifier, which may be referred to as signal sending means. These waveforms contain offset components with respect to a zero level shown by a chain line. Depicting an offset voltage by Voff and an output voltage amplitude by Vi, the level of the non-inverting phase signal is in a range Voff to Voff+Vi and the level of the inverting phase signal is in a range −Voff to −Voff−Vi. FIG. 4(c) shows waveforms of outputs of the peak hold circuits 41 and 42. The peak hold circuit 41 detects and holds the peak value Voff+Vi of the non-inverting phase output and the peak hold circuit 42 detects and holds the peak value −Voff of the inverting phase output. The peak hold circuits 41, 42 may be referred to as peak value detection means. FIGS. 4(d) and 4(e) show output waveforms of the adders 51 and 52 in which the offset voltage Voff is completely cancelled out. The adders 51 and 52 may be referred to as offset removing means.

The output waveforms of the adders 51 and 52 are amplified to desired levels by the differential amplifier 31, resulting in a signal waveform shown in FIG. 4(f). In FIG. 4, a capital letter K represents gain of the differential amplifier 31 which may be referred to as amplitude amplification means. The signal waveform shown in FIG. 4(f) is compared with the reference value by the comparator 80, which may be referred to as duty detection means, resulting in a series of logical values "1" and "0" as shown in FIG. 4(g).

As described, in this embodiment, the degradation of duty factor of the output waveform due to the input signal and the offset of the preamplifier can be prevented by supplying the non-inverting and inverting phase outputs of the preamplifier 20 to the respective peak hold circuits 41 and 42 and then to the respective adders 51 and 52 through the feedforward connections. Even when the receiving signal level is small, the margin for data identification is not lowered and there is no increase of jitter of the extracted clock and no degradation of the synchronizing characteristics of the optical receiving apparatus. Further, since there is no feedbackloop in the differential amplifier 31, the restriction of the signal band and the amplification factor is reduced, which is particularly advantageous in lowering power consumption.

Figure 5:
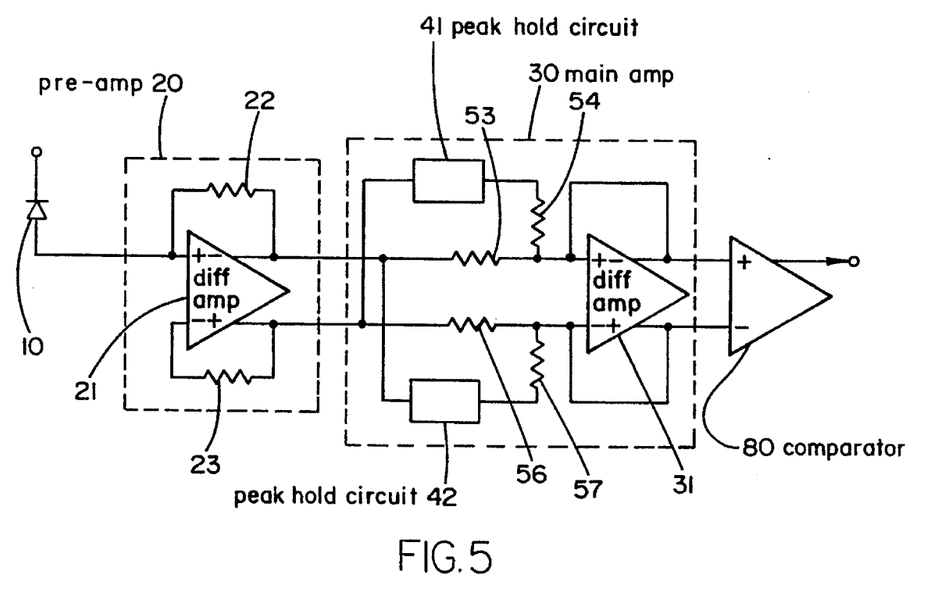
FIG. 5 is a block diagram of a second embodiment of the optical receiving apparatus of the present invention.

FIG. 5 is a block diagram of an optical receiving apparatus according to a second embodiment of the present invention. The second embodiment differs from the first embodiment in only that the adder 51 in FIG. 3 is replaced by a series connection of resistors 54 and 55 and the adder 52 in FIG. 3 is replaced by a series connection of resistors 57 and 56. Setting values of the resistors 54, 53, 57 and 56 commonly equal to R, respectively, each series connection of the resistors functions as an adder having gain of ½. Although the gain of the main amplifier 30 in FIG. 3 is K; the gain of the main amplifier 30 in FIG. 5 is K/2. A basic operation of the embodiment shown in FIG. 5 is the same as that of the first embodiment shown in FIG. 3.

Figure 6:
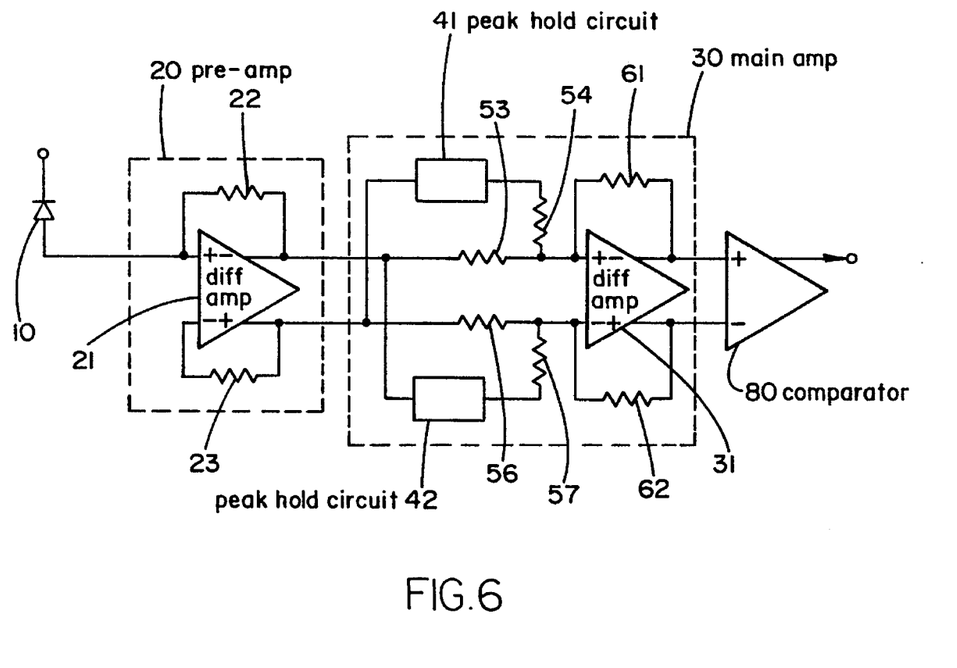
FIG. 6 is a block diagram of a third embodiment of the optical receiving apparatus of the present invention.

FIG. 6 is a block diagram of a third embodiment of the present invention. In this embodiment, the adder 51 in FIG. 3 is replaced by resistors 54 and 53, a differential amplifier 31 and a feedback resistor 61 and the adder 52 in FIG. 3 is replaced by resistors 57 and 56, a differential amplifier 31 and a feedback resistor 62. Setting values of the resistors 54, 53, 57 and 56 equal to R, respectively, and the feedback resistors 61 and 62 to K·R, respectively, gain of the main amplifier 30 becomes K and the apparatus operates in the same way as that of the embodiment shown in FIG. 3.

Figure 7:
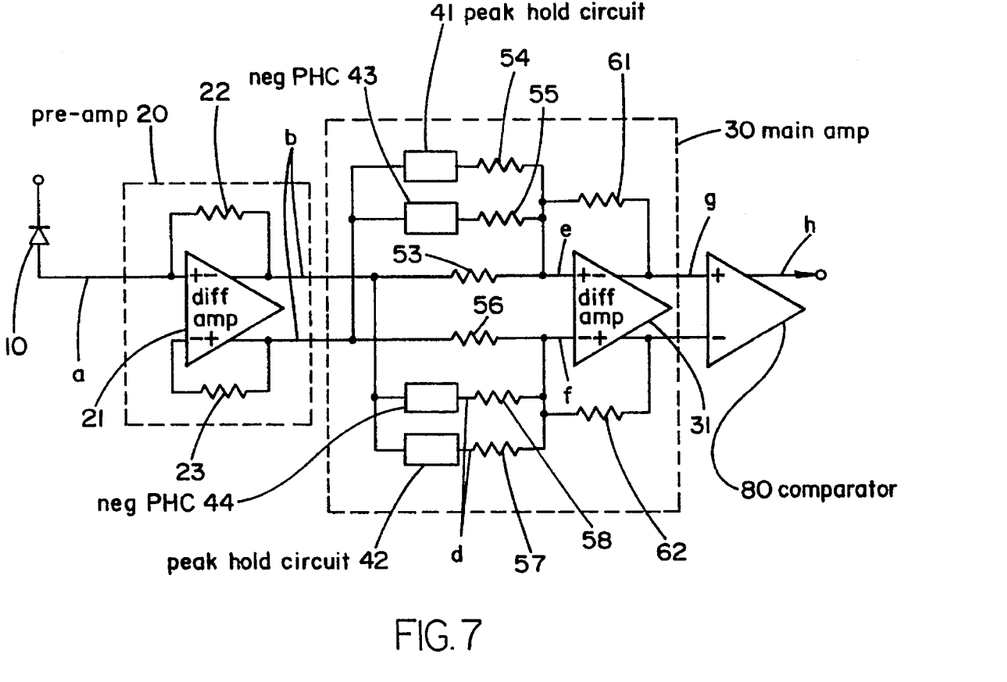
FIG. 7 is a block diagram of a fourth embodiment of the optical receiving apparatus of the present invention.

FIG. 7 is a block diagram of a fourth embodiment of the present invention. A main amplifier 30 is constituted with peak hold circuits 41 and 42, negative peak hold circuits 43 and 44, resistors 53 to 58, a differential amplifier 31 and feedback resistors 61 and 62.

Figure 8:
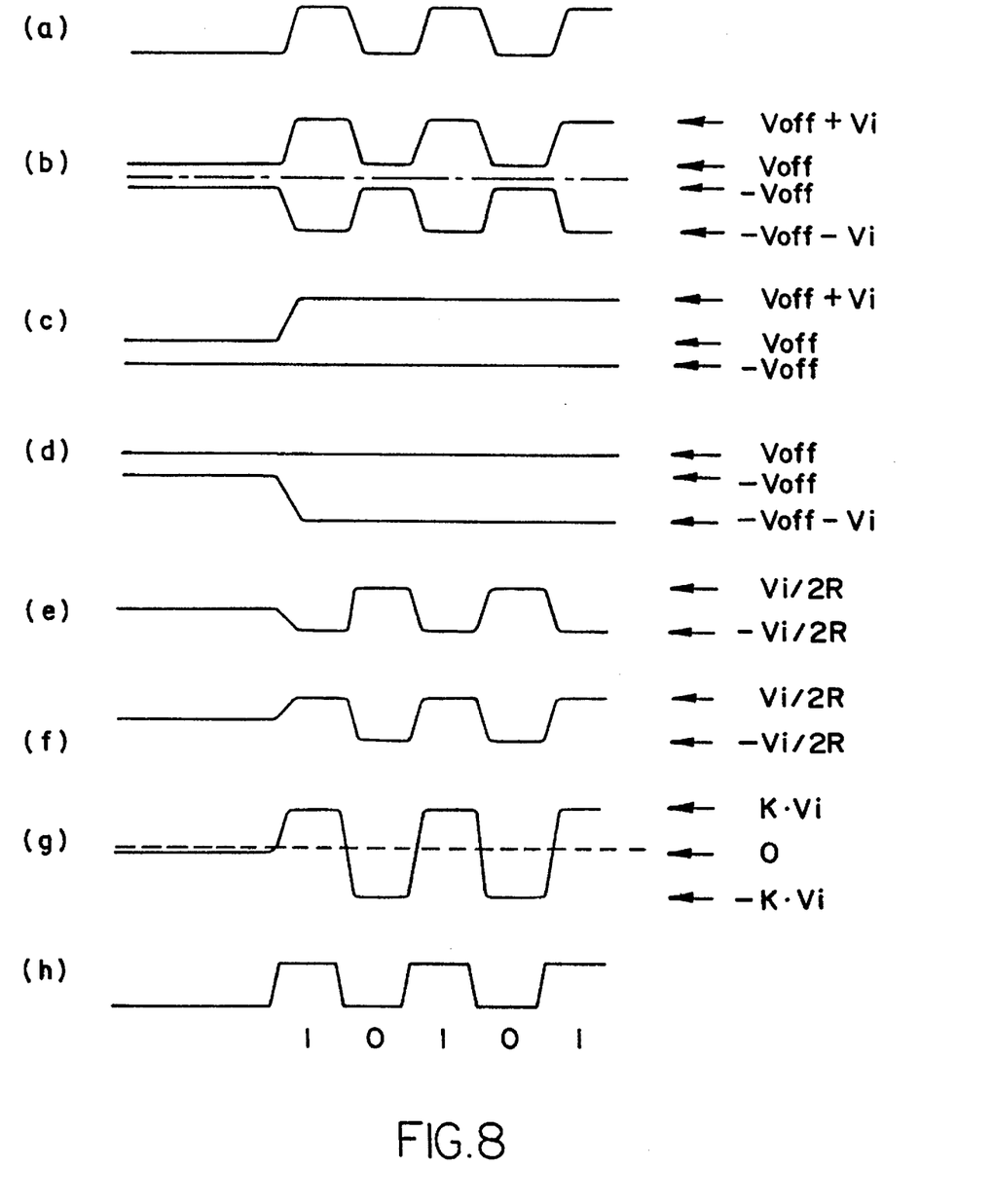
FIG. 8 shows signal waveforms at various portions of the first embodiment of the optical receiving apparatus according to the present invention.

FIG. 8 shows signal waveforms in various portions of the optical receiving apparatus shown in FIG. 7, when the optical receiving apparatus receives digital data in burst. An operation of the optical receiving apparatus shown in FIG. 7 when it is ready to receive an optical signal, that is, holding capacitors of the peak hold circuits 41 and 42 have been discharged and when a burst signal such as shown in FIG. 8(a) is input, will be considered. FIG. 8(b) shows a non-inverting phase output waveform and a inverting phase output waveform of the preamplifier 20. These waveforms contain offset components with respect to a zero level shown by a chain line.

Depicting an offset voltage by Voff and an output voltage amplitude by Vi, the level of the non-inverting phase signal is in a range Voff to Voff+Vi and the level of the inverting phase signal is in a range −Voff to −Voff−Vi. FIG. 8(c) shows waveforms of outputs of the peak hold circuits 41 and 42. The peak hold circuit 41 detects and holds the peak value Voff+Vi of the non-inverting phase output and the peak hold circuit 42 detects and holds the peak value −Voff of the inverting phase output. FIG. 8 (d) shows output waveforms of negative peak hold circuits 43 and 44. The peak hold circuit 43 detects and outputs a negative peak value Voff of the non-inverting phase output and the peak hold circuit 44 detects and outputs a negative peak value −Voff−Vi of the inverting phase output.

For example, values of resistors 54, 55, 57 and 58 are assumed as commonly 2R, values of resistors 53 and 56 are assumed commonly R and values of resistors 61 and 62 are assumed commonly K·R. FIGS. 8(e) and 8(f) show waveforms of currents flowing into respective input terminals of a differential amplifier 31. As is clear from FIGS. 8(e) and 8(f), the offset voltage Voff is cancelled out completely. By converting the current into voltage by the differential amplifier 31 and the feedback resistors 61 and 62 and amplifying the voltage to a desired level, a signal waveform shown in FIG. 8(g) is obtained. The signal waveform shown in FIG. 8 (g) is compared with the reference value by the comparator 80, resulting in a series of logical values "1" and "0" as shown in FIG. 8(h).

Figure 9:
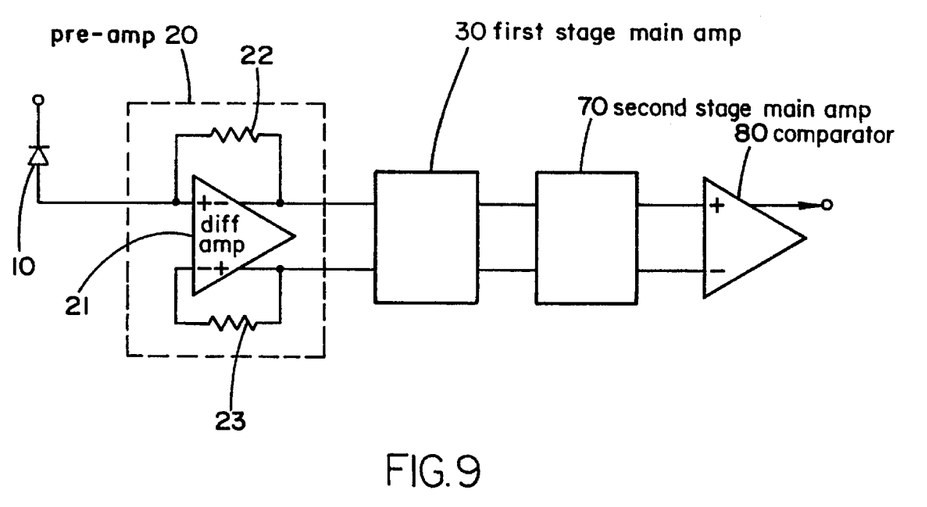
FIG. 9 is a block diagram of a fifth embodiment of the optical receiving apparatus of the present invention.

FIG. 9 is a block diagram of a fifth embodiment of the present invention. An output of a preamplifier 20 is amplified by a main amplifier 30 in a first stage and then it is further amplified by a main amplifier 70 in a second stage. An output of the main amplifier 70 is identified as a logical value "1" or "0" by a comparator 80 in the same way as described with respect to the described embodiments. The main amplifiers 30 and 70 each may be constructed similarly to the main amplifier in the first or fourth embodiment. With the tandem connection of the main amplifiers 30 and 70, it is possible to reduce a gain of each main amplifier. Further, a required preciseness of the main amplifier 70 can be substantially relaxed correspondingly to the gain of the main amplifier 30.

As described hereinbefore, in the optical receiving apparatus according to the present invention, the degradation of duty factor of the output waveform due to the input signal and the offset of the preamplifier can be prevented. This is because the peak values of the non-inverting and inverting phase outputs of the preamplifier 20 are held and added by the feedforward connection. Further, even when the receiving signal level is small, the margin for data identification is not lowered. There is no increase of jitter of the extracted clock and no degradation of the synchronizing characteristics of the optical receiving apparatus. Further, since there is no feedback loop in the differential amplifier, the restriction of the signal band and the amplification factor is reduced, which is particularly advantageous in lowering power consumption.

While the present invention has been described in connection with certain preferred embodiments, it is to be understood that the subject matter encompassed by way of the present invention is not to be limited to those specific embodiments. On the contrary, it is intended for the subject matter of the present invention to include all alternatives, modifications and equivalents as can be included within the spirit and scope of the following claims.

What is claimed is:

1. An optical receiving apparatus comprising:

peak value detection means for detecting a peak value of an input signal and a peak value region including the peak value;

offset removing means for removing an offset from a reference value of the input signal and outputting the input signal without offset;

amplitude amplification means for converting a bottom region of the input signal into the peak value and a inverting value obtained by inverting the peak value about the reference value, amplifying then and outputting an amplitude amplified signal; and duty detection means for detecting a duty of the amplitude amplified signal in the reference value.

2. An optical receiving apparatus comprising:

signal sending means for sending a non-inverting phase signal and a inverting phase signal of an input signal;

first peak value holding means for holding a peak value of the non-inverting phase signal and outputting a non-inverting phase peak value signal;

second peak value holding means for holding a peak value of the inverting phase signal and outputting a non-inverting phase peak value signal;

first adder means for adding the inverting phase signal to the non-inverting phase peak value signal and outputting a non-inverting phase sum signal;

second adder means for adding the non-inverting phase signal to the inverting phase peak value signal and outputting a inverting phase sum signal;

differential amplifier means for differentially amplifying the non-inverting phase sum signal and the inverting phase sum signal and sending a differentially amplified signal; and duty detection means for detecting a duty of the differentially amplified signal.

3. The optical receiving apparatus claimed in claim 2, wherein the input signal is an optical signal, and further comprising an opto-electric conversion means for converting the optical signal into an electric signal.

4. The optical receiving apparatus claimed in claim 3, wherein the input signal is a burst signal.

5. An optical receiving apparatus comprising:

opto-electric conversion means for converting an optical signal into an electric signal;

preamplifier means for sending a non-inverting phase signal and a inverting phase signal of the electric signal;

at least one first peak hold means for detecting and holding a peak value of the inverting phase signal and outputting a non-inverting phase peak signal;

at least one second peak hold means for detecting and holding a peak value of the inverting phase signal and outputting a inverting phase peak signal;

first adder means for adding the inverting phase signal to the non-inverting phase peak signal and outputting a inverting phase sum signal;

second adder means for adding the non-inverting phase signal to the inverting phase peak signal and outputting a non-inverting phase sum signal;

differential amplifier means for differentially amplifying the positive phase sum signal and the inverting phase sum signal and outputting a differentially amplified signal; and comparing means for outputting a binary signal correspondingly to a high and low levels of the differentially amplified signal.

6. The optical receiving apparatus claimed in claim 5, wherein said first adder means comprising a first resistor having one end connected to an output terminal of said first peak hold means and a second resistor having one end connected to an output terminal of said preamplifier means and said second adder means comprising a first resistor having one end connected to an output terminal of said second peak hold means and a second resistor having one end connected to said output terminal of said preamplifier means, and further comprising means for connecting the other terminals of said first and second resistors to respective input terminals of said differential amplifier means.

7. The optical receiving apparatus claimed in claim 5, wherein said first adder means comprises a third resistor for connecting an output terminal of said differential amplifier means to one of said input terminal thereof and said second adder means comprises a third resistor for connecting an output terminal of said differential amplifier means to the other input terminal thereof.

8. The optical receiving apparatus claimed in claim 5, wherein said first peak hold means comprises a non-inverting peak hold means for holding a non-inverting peak value and a inverting peak hold means for holding a inverting peak value and said second peak hold means comprises a positive peak hold means for holding a non-inverting peak value and a inverting peak hold means for holding a inverting peak value.

9. The optical receiving apparatus claimed in claim 5, wherein said differential amplifier means comprises a plurality of series connected amplifier stages and a last amplifier stage is connected to said comparing means.

* * * * *